Patented Apr. 29, 1930

1,756,488

UNITED STATES PATENT OFFICE

JOHN L. KELLOGG, OF CHICAGO, ILLINOIS, ASSIGNOR TO WARREN-TEED SEED COMPANY, OF CHICAGO, ILLINOIS, A CORPORATION OF NEVADA

METHOD OF TREATING SEEDS TO SECURE UNIFORM GERMINATION

No Drawing.     Application filed November 15, 1928.  Serial No. 319,723.

Certain classes of hard shelled seeds, notably the clovers, alfalfa, onion seed and the like, are impervious to moisture to such a degree that when planted they will not absorb the moisture essential to germination for months, and in some cases for a year or more. In most cases some of the seeds germinate promptly, some after a delay of months and some after a delay of a year or even years. This nonuniform germination has several very serious results. Only those seeds that germinate promptly produce a crop within the season. So far as crop production is concerned the other seeds are wasted. Not only are they wasted, but they germinate long after another and different kind of crop has been put in and constitute a pest as deleterious as any weed. The farmer is thus compelled to pay for and go to the expense of preparing the ground for and planting seeds, a large proportion of which not only fail to materialize into a profitable crop, but on the contrary produce a pest which can only be removed at the expense of time and labor. It is therefore essential, if an economical use of the seed is to be had, that they all germinate uniformly and promptly. To secure this result it has heretofore been the practice to treat the entire mass of seeds in a machine (known as a scarifier) provided with an abrading surface against which the seeds are thrown, by centrifugal force or otherwise, whereby the coating of the seeds which resists moisture penetration is reduced or partially removed, to the end that the seeds when planted may be more promptly penetrated by moisture and hence germinate more quickly. This method, however, is open to serious objection. If the scarification is carried far enough to sufficiently affect the seeds most impervious to moisture the others are over-scarified and the germs thereof injured. If the scarification is only carried far enough to properly treat those seeds that are medium-ly slow to germinate, the quickly germinating seeds are over-scarified and injured while those that require the longest time to germinate are under-scarified and hence do not germinate promptly. Moreover, many of the seeds are cracked or scarred to such an extent that germination is injured, if not destroyed. By another method recently invented by Harry R. Warren the mass of seeds is separated into three classes, to wit, those which germinate quickly, those which germinate after moderate delay, and those which germinate after prolonged delay, said three classes being generally known in the art as soft, medium hard, and hard seeds, respectively. The soft seeds are not scarified at all; the medium hard seeds are moderately scarified; and the hard seeds are more severely scarified, to the end that the three classes may have approximately equal capacity for promptly absorbing moisture, and hence germinate uniformly. In effecting the separation into the three classes by the Warren process the mass of seeds is soaked in water to cause the soft seeds to absorb moisture and swell, while the medium hard and the hard seeds do not materially increase in size because they do not readily absorb the water. The swelled soft seeds are then separated from the medium hard and the hard seeds, by screening or otherwise, and the medium hard and the hard seeds are then moderately scarified and again soaked which second soaking results in the swelling of the medium hard seeds, but not the hard seeds. The swollen medium hard seeds are then separated, as by screening, from the hard seeds and the latter still further scarified. This treatment results in substantially uniform germination of all the seeds when the three classes are again mixed and planted. It has been found, however, that when many hard shelled seeds, such as clover, alfalfa and the like, are soaked in water much of the color of the seeds is extracted, leaving the seeds with a faded appearance which injures their market value. Moreover, when the seeds are scarified there is danger of injuring some of them by too deep a scarification cut or by cracking the hard shell.

One object of the present invention is to improve the aforementioned Warren process, to the end that the extraction of the color from the seeds when soaked and the injuries to the same when scarified may be avoided. A further object is to provide an improved process of treating seeds of the same kind, but of varying degrees of hardness, to secure uniform germination.

With these and other objects in view the invention consists in soaking the mass of seeds in a liquid having a color-fixing action on the seeds, whereby the seeds that absorb said liquid are caused to swell, but without extracting the color from the seeds so soaked; then separating out the swollen seeds, as by screening; then moderately scarifying the remaining seeds in the presence of a liquid, as water; again soaking the scarified seeds; separating out, as by screening, the seeds that swell as the result of such second soaking; and then scarifying the remaining seeds in the presence of water or other liquid, whereby the seeds retain their natural color and are uninjured by the scarification. As the color-fixing liquid in which to soak the seeds, an alum solution in the proportions of from one to ten grams of alum to the gallon of water is preferred, though a copper sulphate or other color-fixing solution may be employed. By performing the scarification step in the presence of a liquid (water preferred), it has been found that all danger of too deep scarification or cracking of the seed shells is obviated. The temperature of the liquid in which the seeds are soaked may be varied within a wide range, but should not be high enough to injure the seed germ. It has been found that a temperature of 125° F. may be employed with safety, but preferably a temperature much below this is employed—say as low as 60° F. The lower temperature requires a longer soaking of the seeds, but with less liability to injure them.

It will be readily understood that the step of soaking seeds, in a color-fixing solution and the step of scarifying seeds in the presence of a liquid are capable of use in the treatment of seeds otherwise than in the specific process herein claimed and each of these steps is herein claimed whether used in such specific process or otherwise.

Having thus described the invention, what is claimed is:

1. In a method of treating seeds of the same kind, but of varying degrees of hardness, to secure uniform germination, the steps of soaking the seeds in a color-fixing liquid, separating out the seeds that swell as the result of such soaking, scarifying the remaining seeds in the presence of a liquid, soaking the scarified seeds, and then separating out the seeds that swell as the result of said last soaking.

2. In a method of treating seeds of the same kind, but of varying degrees of hardness, to secure uniform germination, the steps of soaking the seeds in a color-fixing liquid, separating out the seeds that swell as the result of such soaking, scarifying the remaining seeds, soaking the scarified seeds, and then separating out the seeds that swell as the result of said last soaking.

3. In a method of treating seeds of the same kind, but of varying degrees of hardness, to secure uniform germination, the steps of soaking the seeds in a color-fixing liquid at a temperature between 60° F. and 125° F., separating out the seeds that swell as the result of such soaking, scarifying the remaining seeds, soaking the scarifying seeds at a temperature between 60° F. and 125° F., and then separating out the seeds that swell as the result of said last soaking.

4. In a method of treating seeds of the same kind, but of varying degrees of hardness, to secure uniform germination, the steps of soaking the seeds in water having alum dissolved therein, separating out the seeds that swell as the result of such soaking, scarifying the remaining seeds, soaking the scarified seeds, and then separating out the seeds that swell as the result of said last soaking.

5. In a method of treating seeds of the same kind, but of varying degrees of hardness, to secure uniform germination, the steps of soaking the seeds in an alum-water solution at a temperature between 60° F. and 125° F., separating out the seeds that swell as the result of such soaking, scarifying the remaining seeds, soaking the scarified seeds, and then separating out the seeds that swell as the result of said last soaking.

6. In a method of treating seeds of the same kind, but of varying degrees of hardness, to secure uniform germination, the steps of soaking the seeds in water having alum dissolved therein, separating out the seeds that swell as the result of such soaking, scarifying the remaining seeds, again soaking the scarified seeds, separating out the seeds that swell as the result of said second soaking and then again scarifying the remaining seeds.

7. In a method of treating seeds of the same kind, but of varying degrees of hardness, to secure uniform germination, the steps of soaking the seeds in water at a temperature between 60° F. and 125° F., said water having alum dissolved therein, separating out the seeds that swell as the result of such soaking, scarifying the remaining seeds, soaking the scarified seeds at a temperature between 60° F. and 125° F., separating out the seeds that swell as the result of such second soaking, and then scarifying the remaining seeds.

8. In a method of treating seeds of the same kind, but of varying degrees of hardness, to secure uniform germination, the steps of soaking the seeds, separating out the seeds that swell as the result of such soaking, scarifying the remaining seeds in the presence of a liquid, again soaking the scarified seed, and then separating out the seeds that swell as the result of said second soaking.

9. In a method of treating seeds of the same kind, but of varying degrees of hardness, to secure uniform germination, the steps of soaking the seeds in water having alum dissolved therein, separating out the seeds that swell as the result of such soaking, scarifying the remaining seeds in the presence of water, again soaking the scarified seed, and separating out the seeds that swell as the result of such second soaking.

10. In a method of treating seeds of the same kind, but of varying degrees of hardness, to secure uniform germination, the steps of soaking the seeds in a color-fixing liquid, separating out the seeds that swell as the result of such soaking, scarifying the remaining seeds, again soaking the scarified seeds, separating out the seeds that swell as the result of such second soaking, and separating weed seeds from the remainder.

11. In a method of treating seeds of the same kind, but of varying degrees of hardness, to secure uniform germination, the steps of soaking the seeds, separating out the seeds that swell as the result of such soaking, scarifying the remaining seeds in the presence of a liquid, again soaking the scarified seeds, separating out the seeds that swell as the result of such second soaking, again scarifying the then remaining seeds in the presence of a liquid, and separating weed seeds from said then remaining seeds.

12. In a method of treating seeds of the same kind, but of varying degrees of hardness, to secure uniform germination, the steps of soaking the seeds in an alum solution, separating out the seeds that swell as the result of such soaking, scarifying the remaining seeds in the presence of water, again soaking the scarified seeds, separating out the seeds that swell as the result of such second soaking, again scarifying the then remaining seeds in the presence of water, and separating weed seeds from the three classes of seeds thus secured.

13. In a method of treating seeds of the same kind, but of varying degrees of hardness, to secure uniform germination, the steps of soaking the seeds, screening out the seeds that swell as the result of such soaking, scarifying the remaining seeds in the presence of water, again soaking the scarified seeds, and screening out the seeds that swell as the result of such second soaking.

14. In a method of treating seeds of the same kind, but of varying degrees of hardness, to secure uniform germination, the steps of soaking the seeds in an alum solution, separating out the seeds that swell as the result of such soaking, scarifying in the presence of water the remaining seeds, again soaking the scarified seeds, separating out the seeds that swell as the result of such second soaking, and then scarifying the then remaining seeds in the presence of water.

15. In a method of treating seeds of the same kind, but of varying degrees of hardness, to secure uniform germination, the step of soaking the seed in an alum solution.

16. In a method of treating seeds of the same kind, but of varying degrees of hardness, to secure uniform germination, the step of soaking the seed in water having alum dissolved therein.

17. In a method of treating seeds of the same kind, but of varying degrees of hardness, to secure uniform germination, the step of soaking the seed in an alum solution at a temperature between 60° F. and 125° F.

18. The method of treating seeds of the same kind, but of varying degrees of hardness, to secure uniform germination which consists in subjecting the mass of seeds to moisture whereby some of them are swelled, separating from the mass the seeds so swelled, and scarifying the remaining seeds of the mass in the presence of water to quicken their moisture-absorbing action.

19. The method of treating seeds of the same kind, but of varying degrees of hardness, to secure uniform germination which consists in subjecting the mass of seeds to moisture whereby some of them are swelled, separating from the mass the seeds so swelled, and scarifying the remaining seeds of the mass in the presence of a liquid, to quicken their moisture-absorbing action.

20. In a method of treating seeds of the same kind, but of varying degrees of hardness, to secure uniform germination, the steps of separating the seeds into classes of differing moisture-absorbing properties, and then scarifying in the presence of water the classes that absorb moisture slowly to quicken their moisture-absorbing action.

21. The method which consists in scarifying seeds in the presence of a liquid.

22. The method which consists in scarifying seeds in the presence of water.

23. The method which consists in causing seeds to swell by soaking them in a color-fixing liquid.

24. The method which consists in soaking seeds in an alum solution.

In testimony whereof I have signed this specification.

JOHN L. KELLOGG.